United States Patent
Heller et al.

(10) Patent No.: US 8,205,009 B2
(45) Date of Patent: Jun. 19, 2012

(54) APPARATUS FOR CONTINUOUS COMPRESSION OF LARGE VOLUMES OF DATA

(75) Inventors: Yair Heller, Tel Aviv (IL); Ziv Kedem, Tel Aviv (IL); Michael Lewin, Modiin (IL); Shay Mannor, Haifa (IL)

(73) Assignee: EMC Israel Development Center, Ltd., Netanya (IL)

( * ) Notice: Subject to any disclaimer, the term of this patent is extended or adjusted under 35 U.S.C. 154(b) by 1125 days.

(21) Appl. No.: 10/512,687

(22) PCT Filed: Apr. 1, 2003

(86) PCT No.: PCT/IL03/00270
§ 371 (c)(1),
(2), (4) Date: Aug. 24, 2005

(87) PCT Pub. No.: WO03/092166
PCT Pub. Date: Jun. 11, 2003

(65) Prior Publication Data
US 2006/0212462 A1    Sep. 21, 2006

Related U.S. Application Data

(60) Provisional application No. 60/375,007, filed on Apr. 25, 2002.

(51) Int. Cl.
*G06F 15/173* (2006.01)
(52) U.S. Cl. .................. 709/246; 709/224; 709/247
(58) Field of Classification Search .............. 709/246, 709/247; 707/101; 370/477
See application file for complete search history.

(56) References Cited

U.S. PATENT DOCUMENTS 5,170,480 A   12/1992   Mohan et al.
5,249,053 A   9/1993    Jain
(Continued)

FOREIGN PATENT DOCUMENTS

EP   1154356   11/2001
(Continued)

OTHER PUBLICATIONS

Retrieved from http://en.wikipedia.org/wiki/DEFLATE DEFLATE, Jun. 19, 2008, pp. 1-6.

(Continued)

*Primary Examiner* — Emmanuel L Moise
*Assistant Examiner* — Edward Kim
(74) *Attorney, Agent, or Firm* — Daly, Crowly, Mofford & Durkee, LLP (57) ABSTRACT

A system for efficiently transmitting data from a first site to a remote site over a communication medium. The data includes a storage for storing data in sub-segment boundaries, such that few sub-segments are accommodated in each block. The system further includes a storage for storing data including signature data. Each one of the sub-segments is associated with a signature of considerably smaller size than its respective sub-segment. The system includes a processor configured to perform the following, as many times as required: receiving a block and partitioning it into sub-segments. For each sub-segment in the block the processor calculating a signature. It then determines whether the calculated signature matches a corresponding signature, if any, stored in the signature storage, and in case of no match (indicating that the sub-segment is new or has been modified), transmitting the sub-segment to the remote site and store the calculated signature in the signature storage.

31 Claims, 6 Drawing Sheets

U.S. PATENT DOCUMENTS

| | | | |
|---|---|---|---|
| 5,499,367 A | | 3/1996 | Bamford et al. |
| 5,526,397 A | * | 6/1996 | Lohman ................. 455/560 |
| 5,864,837 A | * | 1/1999 | Maimone .................. 1/1 |
| 5,879,459 A | | 3/1999 | Gadgil et al. |
| 6,042,652 A | | 3/2000 | Hyun et al. |
| 6,065,018 A | | 5/2000 | Beier et al. |
| 6,143,659 A | | 11/2000 | Leem |
| 6,148,340 A | * | 11/2000 | Bittinger et al. ............ 709/224 |
| 6,148,360 A | * | 11/2000 | Leak et al. .................. 710/260 |
| 6,174,377 B1 | | 1/2001 | Doering et al. |
| 6,174,809 B1 | | 1/2001 | Kang et al. |
| 6,203,613 B1 | | 3/2001 | Gates et al. |
| 6,260,125 B1 | | 7/2001 | McDowell |
| 6,270,572 B1 | | 8/2001 | Kim et al. |
| 6,272,534 B1 | * | 8/2001 | Guha ........................... 709/216 |
| 6,287,965 B1 | | 9/2001 | Kang et al. |
| 6,467,023 B1 | | 10/2002 | DeKoning et al. |
| 6,574,657 B1 | * | 6/2003 | Dickinson .................... 709/203 |
| 6,947,981 B2 | | 9/2005 | Lubbers et al. |
| 7,043,610 B2 | | 5/2006 | Horn et al. |
| 7,051,126 B1 | | 5/2006 | Franklin |
| 7,076,620 B2 | | 7/2006 | Takeda et al. |
| 7,111,197 B2 | | 9/2006 | Kingsbury et al. |
| 7,117,327 B2 | | 10/2006 | Hirakawa et al. |
| 7,120,768 B2 | | 10/2006 | Mizuno et al. |
| 7,130,975 B2 | | 10/2006 | Suishu et al. |
| 7,139,927 B2 | | 11/2006 | Park et al. |
| 7,159,088 B2 | | 1/2007 | Hirakawa et al. |
| 7,167,963 B2 | | 1/2007 | Hirakawa et al. |
| 7,222,136 B1 | | 5/2007 | Brown et al. |
| 7,296,008 B2 | | 11/2007 | Passerini et al. |
| 7,328,373 B2 | | 2/2008 | Kawamura et al. |
| 7,360,113 B2 | | 4/2008 | Anderson |
| 7,426,618 B2 | | 9/2008 | Vu et al. |
| 7,516,287 B2 | | 4/2009 | Ahal et al. |
| 7,577,867 B2 | | 8/2009 | Lewin et al. |
| 7,627,612 B2 | | 12/2009 | Ahal et al. |
| 7,627,687 B2 | | 12/2009 | Ahal et al. |
| 2002/0129168 A1 | * | 9/2002 | Kanai et al. .................... 709/247 |
| 2003/0048842 A1 | | 3/2003 | Fourquin et al. |
| 2003/0110278 A1 | * | 6/2003 | Anderson .................... 709/231 |
| 2003/0145317 A1 | * | 7/2003 | Chamberlain ............... 717/177 |
| 2004/0205092 A1 | | 10/2004 | Longo et al. |
| 2004/0250032 A1 | | 12/2004 | Ji et al. |
| 2004/0254964 A1 | | 12/2004 | Kodama et al. |
| 2005/0015663 A1 | | 1/2005 | Armangau et al. |
| 2005/0273655 A1 | | 12/2005 | Chow et al. |
| 2006/0047996 A1 | | 3/2006 | Anderson et al. |
| 2006/0064416 A1 | | 3/2006 | Sim-Tang |
| 2006/0107007 A1 | | 5/2006 | Hirakawa et al. |
| 2006/0117211 A1 | | 6/2006 | Matsunami et al. |
| 2006/0161810 A1 | | 7/2006 | Bao |
| 2006/0195670 A1 | | 8/2006 | Iwamura et al. |
| 2007/0162513 A1 | | 7/2007 | Lewin et al. |
| 2007/0180304 A1 | | 8/2007 | Kano |
| 2007/0198602 A1 | | 8/2007 | Ngo et al. |
| 2007/0198791 A1 | | 8/2007 | Iwamura et al. |
| 2007/0266053 A1 | | 11/2007 | Ahal et al. |

FOREIGN PATENT DOCUMENTS

WO    WO 00 45581 A3    8/2000

OTHER PUBLICATIONS

Retrieved from http://en.wikipedia.org/wiki/Huffman_coding HUFFMAN CODING, Jun. 8, 2008, pp. 1-11.

Retrieved from http:///en.wikipedia.org/wiki/LZ77, LZ77 and LZ78, Jun. 17, 2008, pp. 1-2.

Microsoft Computer Dictionary, 2002, Microsoft Press, Fifth Edition, p. 58.

Response to Office Action dated Jan. 11, 2011 filed Mar. 17, 2011 for U.S. Appl. No. 12/238,735, 14 pages.

* cited by examiner

FIG. 1a

PRIOR ART

FIG. 1b

PRIOR ART

APPARATUS FOR CONTINUOUS COMPRESSION OF LARGE VOLUMES OF DATA

FIELD OF THE INVENTION

The field of the invention is data compression. Specifically, this invention is related to storage communications and compression of replication and backup traffic.

BACKGROUND OF THE INVENTION

In many communications systems, there is a need to transfer digital data over communication medium. In several applications, most of the data is transferred over and over to the remote side with only a small fraction of the data changed. These applications include replication, backup, and data migration. For example, if a certain disk is replicated over network to a remote site then for most replication techniques even if only a single bit is modified, a whole block is transferred over the remote site.

Signatures are a generic name for hash style functions that map a relatively large data object (e.g., 2048 bytes) to a small number of bits (e.g., 64 bits). These functions have the following property—when the large objects changes by a little the value of the map changes considerably. Hash functions (e.g., MD5, SHA-1, HMAC) are extensively used in many applications as means to store data quickly and efficiently and for data integrity purposes.

Figure 1A:
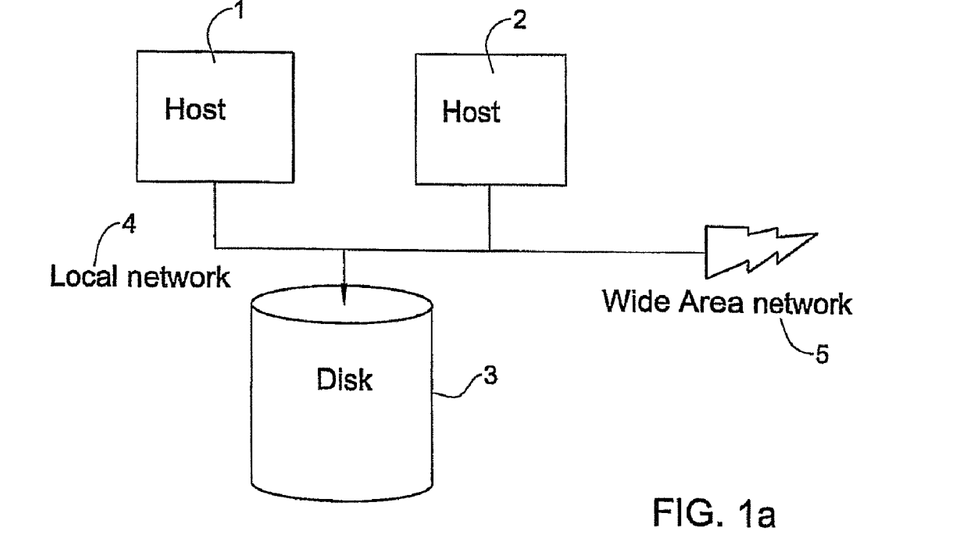
FIG. 1a is an example of a currently wide spread architecture.
Figure 1B:
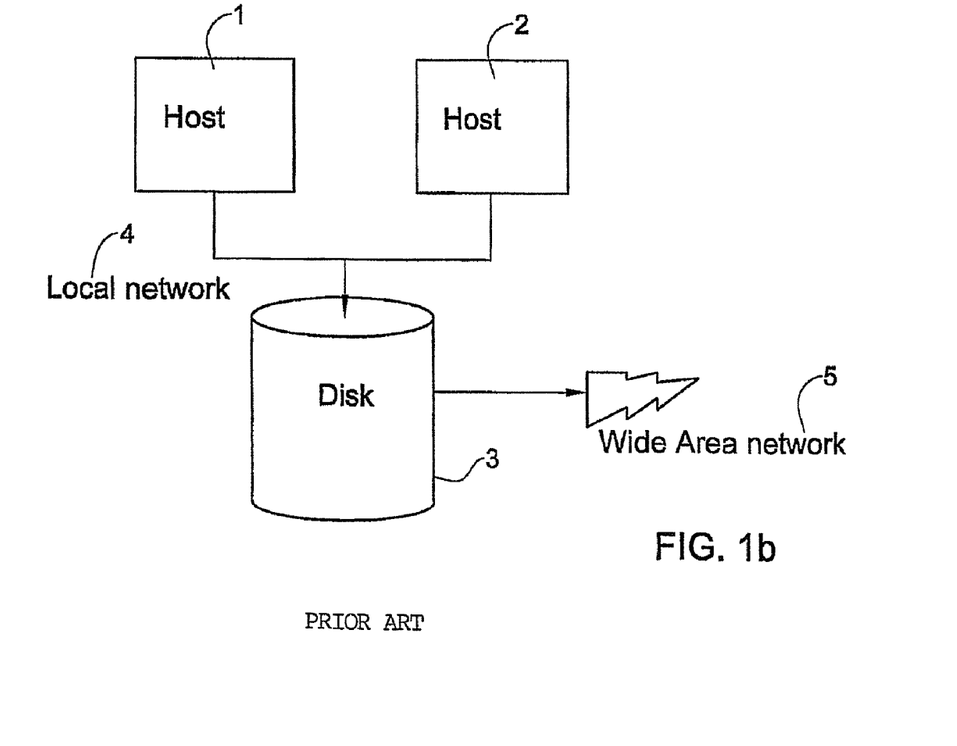
FIG. 1b is an example of a known common architecture.

In FIG. 1a, the situation in current storage sub-systems is demonstrated. The nodes Host 1 and Host 2 communicate with Disk 3 using local communication 4. Typically, the disk is a storage sub-system (e.g., RAID disk) and the local communication lines are either Local Area Network (LAN) or Storage Area Network (SAN). When each host writes information to the disk it is sent also over the Wide Area Network 5 to a remote backup system (instead of Wide Area Network, Metropolitan Area Network or dedicated communication lines may be used). The problem with the specified configuration is that for every bit changed a block is sent over the network lines. This is not only expensive, but also causes considerable delay and slow downs. A second configuration, which is common today, is shown in FIG. 1b. In that configuration the storage system itself communicates over Wide Area Network to the remote system. Still, whenever a block is written on the storage sub-system it is transmitted over the network lines.

Glossary:

There follows a glossary of terms. The invention is not bound by this particular definitions, which are provided for convenience only.

Segment—A segment is a unit of data that is transferred from the host to the storage system. This includes disk tracks and file system blocks. For example, a segment may be a block of size 16 KB.

Sub-segment—A part of a segment. The size of a sub-segment may vary in size and may not be of equal size per sub-segment. For example, a segment may be a part of size 1 KB. The size of sub-segment may differ from segment to segment and depend on content, location in the storage sub-system and so forth.

Signature function—A signature function is a mapping from Sub-segments to signatures. A signature is of size of e.g. 64-128 bits while the sub-segment is of size of e.g. hundreds to thousands of Bytes. The signature function maps two sub-segments that were slightly changed to different signatures. Typical yet not exclusive examples of signature functions are CRC (Cyclic Redundancy Code), hash functions such as MD2, MD4, MD5, SHA, SHA-1, various types of checksum, hash functions that are based on a block cipher (e.g. the Davies-Meyer hash function), RIPEMD-160, HAVAL.

Signature—a collection of bits that is the result of activating the signature function on a sub-segment. This collection of bits distinguishes with high probability between two sub-segments.

Communication medium—physical and logical devices used to transfer bits from one place to another. For instance, Internet Protocol (IP) over Wide Area Network (WAN), leased lines communications, Fiber Channel and so forth.

Volume—A collection of segments that logically belong to the same application and possibly share common characteristics.

SUMMARY OF THE INVENTION

By one aspect of the invention, when a data segment enters the compression system it is partitioned to sub-segments. A list of signatures per data sub-segment is maintained. Each signature is the result of activating a signature function (such as hash function) on the value of the sub-segment. When a segment is to be transferred over the communication lines it is examined whether the segment contains sub-segments that were not modified. Calculating the signature for each sub-segment efficiently performs this examination. If the signature of a given sub-segment matches the signature of the same segment (that was already transferred to a remote site), then there is no need to re-transfer the sub-segment again. Compression is achieved by not sending data that was not changed. The signatures mechanism enables comparison to a large amount of data without storing all that data in memory but only its signatures.

The invention provides for a system for efficiently transmitting data from a first site to at least one remote site over a communication medium, the data includes blocks of data; the system comprising:

storage for storing data in sub-segment boundaries, such that at least one sub-segment is accommodated in each block;

storage for storing data including signature data; each one of said sub-segments is associated with at least one signature; each signature has a signature size considerably smaller than its respective sub-segment size;

the system includes a processor configured to perform at least the following, as many times as required:

receiving a block and in the case it accommodates more than one sub-segment partitioning it into sub-segments;

for each sub-segment in the block calculating at least one signature;

determining whether calculated signature matches corresponding signature, if any, stored in the signature storage, and in case of no match indicating that the sub-segment is new or has been modified, transmitting the sub-segment or derivative thereof to at least one of said remote sites, and store the calculated signature in the signature storage.

The invention further provides for a processor for operating in a system for efficiently transmitting data from a first site to at least one remote site over a communication medium, the data includes blocks of data;

the system includes storage for storing data in sub-segment boundaries, such that at least one sub-segment is accommodated in each block; the system further included storage for storing data including signature data; each one of said sub-segments is associated with at least one signature; each signature has a signature size considerably smaller than its respective sub-segment size;

the processor configured to perform at least the following, as many times as required:

receiving a block and in the case it accommodates more than one sub-segment partitioning it into sub-segments;

for each sub-segment in the block calculating at least one signature;

determining whether calculated signature is identical to corresponding signature, if any, stored in the signature storage, and in case of no match indicating that the sub-segment is new or has been modified, transmitting the sub-segment or derivative thereof to at least one of said remote sites, and store the calculated signature in the signature storage.

Still further, the invention provides for a method for efficiently transmitting data from a first site to at least one remote site over a communication medium, the data includes blocks; the method comprising:

receiving a succession blocks and partitioning each to sub-segments, if required;

processing the sub-segments and transmitting to the at least one remote site only those sub-segments whose associated signature indicates that they were changed.

Yet further, the invention provides for a method for processing data to generate a compressed data for transmission over communication medium, comprising:

processing successions of data portions and identify those portions which were changed;

generating a compressed data that includes data portions which were changed, and transmitting the compressed data over the communication medium.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF THE INVENTION

Figure 2:
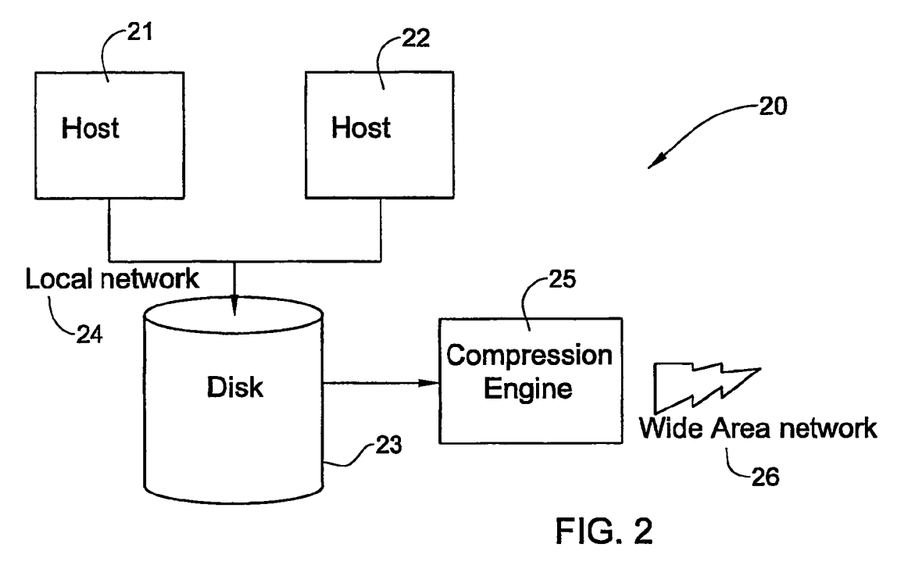
FIG. 2 describes a system architecture in accordance with an embodiment of the invention.

Attention is first drawn to FIG. 2 illustrating a system architecture in accordance with an embodiment of the invention.

In accordance with the system architecture 20 of FIG. 2, every data segment that is written is transferred from the host (e.g. 21 or 22), through local network 24, both to the storage sub-system 23 and to the compression engine 25. After having been processed in compression engine 25 (in a manner that will be described in more detail below), the data is sent from the compression engine 25 over the Wide Area Network 26 for storage.

Note that an important difference from prior art solutions, such as the one described with reference to FIG. 1a, is that instead of sending the data directly over the Wide Area Network, the data is first processed in the compression engine and only, if required, the data is transmitted over the Wide Area Network. This allows considerable bandwidth reduction. For example, one may consider the following scenario. Suppose that the segments are blocks and that every block is of size of e.g. 32 KB. For exemplary transactional database blocks, a change may happen in e.g. two locations, say a first location where the first few bytes (in the header section) and a second location inside the block. Note that the number of sub-segments that vary in each block (if at all) depends on the particular application.

Reverting now to the example above, by partitioning the block to sub-segments of, say size 1 KB the compression engine 25 determines that only the first sub-segment which accommodates the header section should be transmitted over the network 26 and that additionally one or possibly two more sub-segments that accommodate the data stored in the second location should be transmitted over the network 26. Note that transmitting of additional two (rather than one) sub-segments would be required only if the modified data in the second location are not wholly contained in one sub-segment but rather overflow to another sub-segment. It would thus be appreciated that in the specified scenario it is more likely that only two sub-segments needs to be transmitted over the Wide area network 26. As may be recalled in accordance with the specified prior art solution al the sub-segments are transmitted (i.e. 32) This leads to a compression rate of 1:16 (in the case that two sub-segments are transmitted) or 1:10 (in the case that two sub-segments are transmitted) per block.

Figure 3:
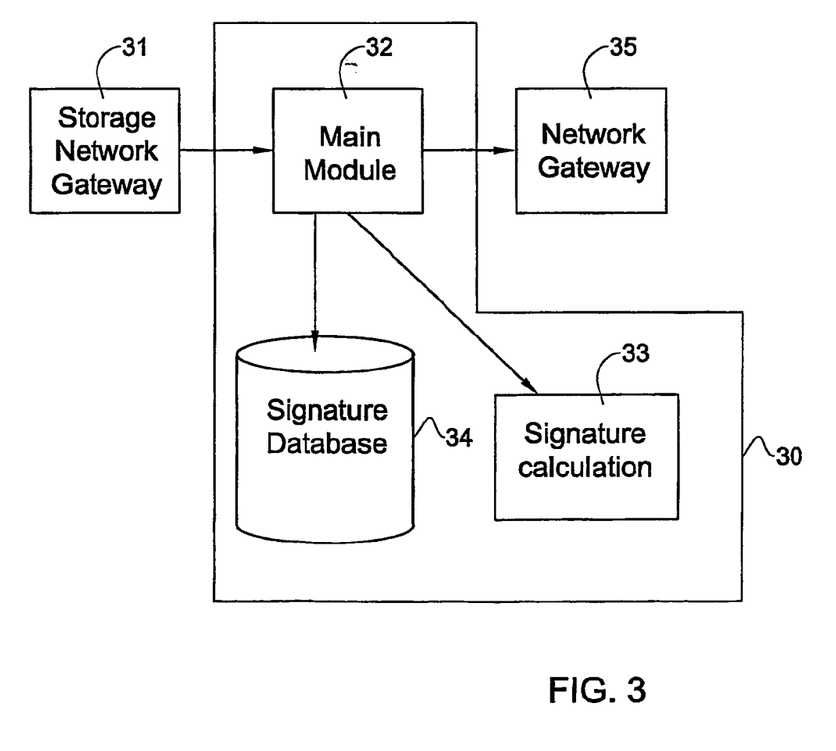
FIG. 3 describes a more detailed system architecture in accordance with an embodiment of the invention.

For a better understanding of the foregoing, attention is directed to FIG. 3 illustrating a more detailed system architecture in accordance with an embodiment of the invention. Thus, a storage network gateway 31 receives data from the hosts (of which two, i.e. 21 and 22 are shown in FIG. 2). The gateway 31 is coupled to module 32 which in turn is coupled to signature database 34, signature calculation 33 and network gateway 35. Note that by this embodiment module 32, signature database 34 and signature calculation 33 form part of the compression engine 25 of FIG. 2. Those versed in the art will readily appreciate that the system architecture of the invention is not bound to the specific embodiments of FIGS. 2 and 3. Thus, by way of a specific embodiment, the signature storage does not form part of the compression engine. Other variants are applicable, all as required and appropriate. Note also that whilst for convenience description below focuses on compression engine, those versed in the art will readily appreciate that this a non limiting example of a processor that is configured to perform the operations in accordance with various embodiments of the invention. The invention is not bound to any particular processor and accordingly a processor in the context of the invention may encompass a distinct processor, plurality of processors, or other variants for performing the processing operations in accordance with the various embodiments of the invention.

In operation, a segment (referred to interchangeably also as block) that was received e.g. from a given host, say 21 (of FIG. 2) is partitioned into sub-segments in module 32. For every sub-segment a signature is calculated in signature calculation module 33, using signature function of the kind discussed above. Next, it is necessary to ascertain if the calculated signature is identical to its corresponding stored signature in database 34. To this end, the old (i.e. stored) signature that corresponds to this particular sub-segment (if exists) is retrieved efficiently from the database 34, using e.g. caching techniques and/or context switching (as will be explained in greater detail below). If the old signature does not exist (signifying that the current sub-segment is new), then module 32 triggers transmission of the new sub-segment through network gateway 35 to the WAN 26 to the remote site and the calculated signature is stored in the signature database 34. Obviously, the new sub-segment is stored in storage 23 (see FIG. 2). It should be noted that for any described embodiment, sub-segments that are transmitted over the network (say 26 in FIG. 1) may be subject to known per se compression techniques, such as Lempel-Ziv based coding, or other techniques, all as known per se. Accordingly, whenever reference is made to transmission of sub-segments it may apply to derivative thereof, such as the specified non-limiting example of compressed data using e.g., Lempel-Ziv-based coding, Lempel-Ziv-Welch coding, Huffman coding.

Alternatively, if a corresponding old signature is found in the signature database 34, this signifies that this sub-segment already exists and what remains to be done is to ascertain whether it has been modified (in which case it should be transmitted) or it has not been modified in which case there is nothing to be done. To this end, the old signature is retrieved and compared (in module 32) to the so calculated signature (that corresponds, as recalled, to the sub-segment under consideration). If the signature values differ, this signifies that newly arriving sub-segment has been modified (compared to the currently stored version thereof), and that accordingly it (i.e. the modified sub-segment) should be transmitted through Gateway 36 to the remote site. The newly calculated signature is stored in the signature database 34 and, obviously, the modified sub-segment is stored in storage 23.

Lastly, if the so retrieved signature and the newly calculated signature are identical, this signifies, with high degree of certainty, that the sub-segment has not been changed and that accordingly there is no need to transmit it to the remote site and, obviously, the need to store it and its corresponding calculated signature is obviated.

Note that in the latter scenario (i.e. identical signatures), there is a small probability of mistake, i.e. that different sub-segment values will nevertheless be mapped to the same signature value. This error is inherent to the signature function, however, for all practical purposes it is negligible. Generally speaking, the chance of a mistake per sub-segment is of the order of 1 over 2 to the power the number of bits. For instance, when using a signature 64-bit-long, this error is of the order of 5E-20, which is negligible.

Note also that in the latter example (i.e. sub-segment of 1 KB and signature of 64 bits), the memory required for storing all the signature of, say, a 1 TB disk is about 8 GB, which can be easily stored on standard disk systems. The invention is, of course, not bound by any specific block size, sub-segment size and signature size. Whilst normally a block accommodates two or more sub-segments in certain embodiments it may include one. I.e. it constitutes a sub-segment.

Figure 4:
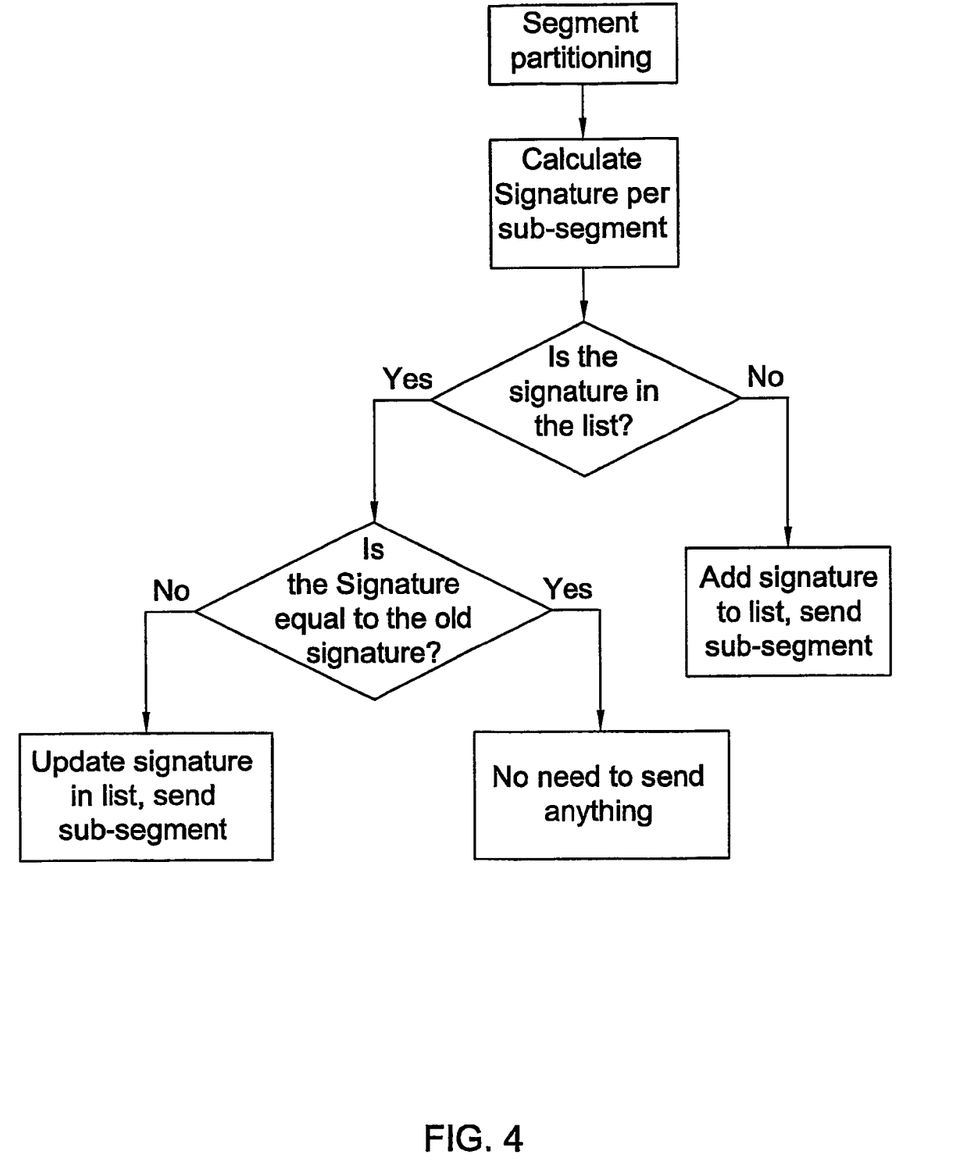
FIG. 4 illustrates a flow diagram of the operational steps carried out in a system according to one embodiment of the invention.

The invention is likewise not bound to the specific embodiments described with reference to FIG. 2 to FIG. 4. For example, hosts of same or different types may be used, the communication medium is not bound to LAN 24 or WAN 26 or to any specific storage architecture 23 or 34. Other variants, also in respect of the specific modules depicted in FIG. 3 are applicable, all as required and appropriate. Note also that remote site does not necessarily bound to distinct remote storage or distinct geographical sites. Thus, remote site encompasses one or more remote storage located in one or more remote geographical sites.

A sequence of operation in accordance with an embodiment discussed above is also shown in the flow chart of FIG. 4. Thus, every data segment is partitioned to sub-segments. The signature of each sub-segment is calculated. For every sub-segment it is checked if its signature appears in the available signatures list. If it does, then the new signature and the old signature are compared. If both signatures are equal then nothing is done and the sub-segment is not transferred. Otherwise, if either the signature differs or it is not available, then the sub-segment is transferred over the communication medium and the signature is stored in the signature storage.

As specified above, in accordance with the invention, data (such as sub-segments) are transmitted over the WAN (e.g. 26 of FIG. 2) whenever necessary. The system of the invention may be utilized for various applications, such as:

Data Replication: in Data replication there are at least two volumes which essentially keep the same data, with one volume possibly less updated due to transmission time. There are three common modes for replication. Synchronous mode (both volumes are exactly the same at all times). This mode requires continuous update, i.e. for every modification in the first volume, the second volume should be updated accordingly, at substantially no delay. In a second, a-synchronous mode, both volumes are almost the same, with allowed inconsistencies measured in time or number of writes, and a third, snapshot mode (referred to also as point-in-time), in which the two volumes are not the same, but are synchronized to be the same once in a while. Note that in the second and third modes the remote volume is not updated for a given time interval, until the next update occurs. Whilst for convenience, the description herein refers to a volume, it is of course not bound to any specific structure or content of the storage.

In any of the specified modes, only new sub-segments or sub-segments which were modified are transmitted to the other volume.

Backup: This is essentially a one time operation where all the data is moved from one place to another. Often, the data is moved repeatedly to the same location, and accordingly the invention can be used for backup purposes since the data contained in the two volumes may be similar. Here also, only new sub-segments or sub-segments which were modified are transmitted to the other volume.

Data Migration: In data migration a volume is copied to a new site where the current data is most likely very different. Accordingly, the technique of the invention can be used in order to identify repetitions in sub-segments, and if such repetitions are detected there is no need to transfer again (to the remote site) the entire sub-segment, but rather a derivative thereof in a form of short code. Here also, only new sub-segments or sub-segments which were modified are transmitted to the remote site.

The invention is not bound by the specific implementations in respect of each of the above applications and accordingly other replication, backup and data migration may be applicable. Moreover, it may also be utilized in other applications, all as required and appropriate.

Reverting now to the operation of various embodiments of the invention, as was explained above, it is desired to employ an efficient retrieval of signatures from the signature database 34 in order to avoid undesired overhead insofar the system performance is concerned.

As may be recalled, when a calculated signature is compared to a stored signature (in a manner described above, in detail with reference to FIGS. 2-4), the system performance may be adversely affected due to the need to access the slow signature storage (such as the 8 Giga Byte disk (disks) that accommodates the signature database) and find the signature that corresponds to the so calculated signature. Accordingly, by one embodiment, in order to improve the system performance, a fast storage (referred to occasionally also as memory), e.g. cache memory, is used in order to pre-fetch from the slow storage into the fast storage a group of signatures that comply with a given criterion. By a non-limiting example, the criterion being to load and store in the fast memory signatures of frequently sub-segments. Thus, there are high prospects to locate in the fast memory a signature that corresponds to a calculated signature of a frequently used sub-segment rather than access the slow storage, thereby obviously improving system performance. Such a frequently used sub-segments are regularly found in various applications, including bank applications. The more signatures that are found in the fast storage the less the need to access the slow storage and the better are the system performance. Note, incidentally, that in this context, pre-fetching (referred to occasionally in other terms in the description) refer to the operation of loading data from the slow storage to the fast storage.

Figure 5:
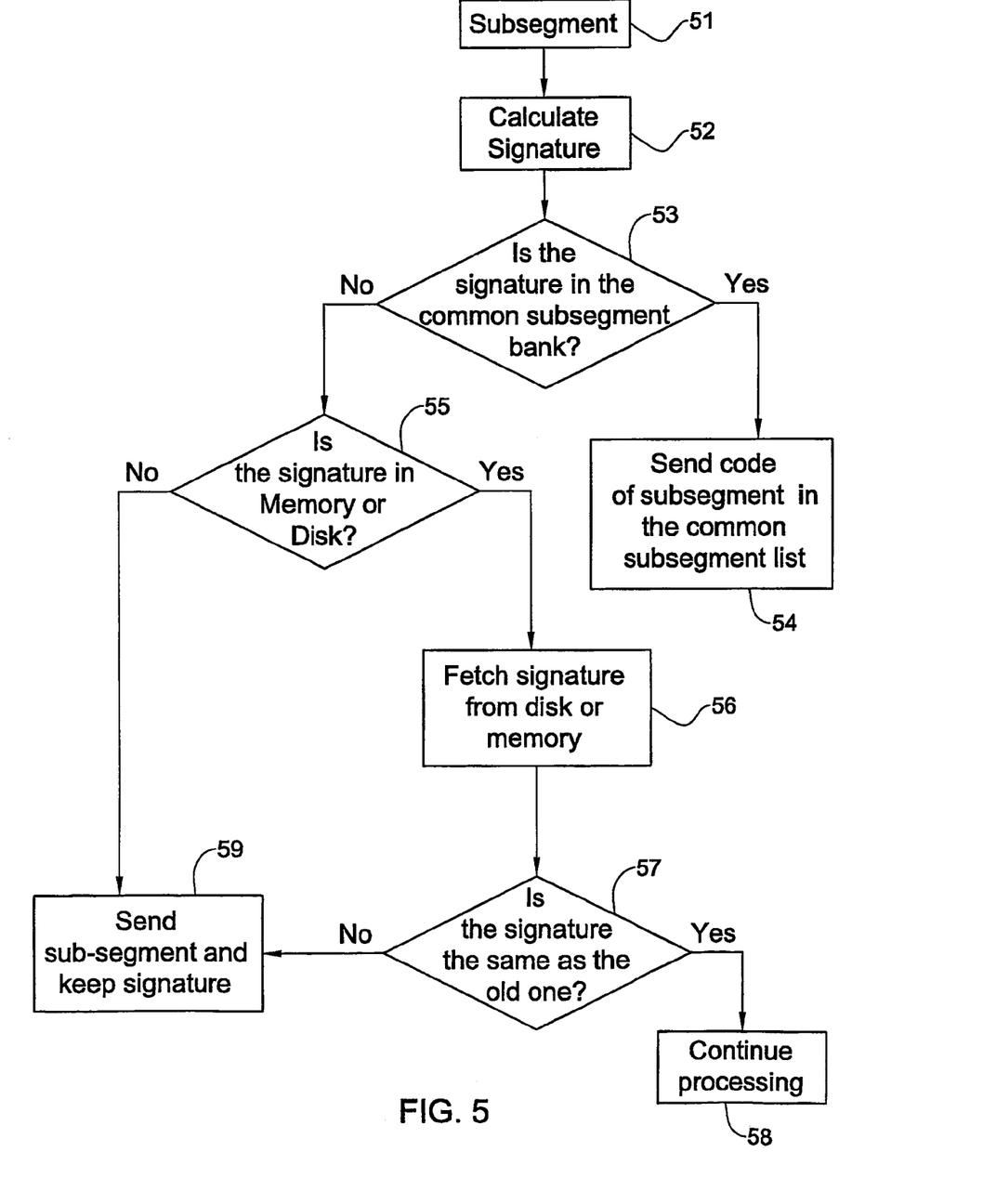
FIG. 5 illustrates a flow chart of the operational steps of signature calculation and retrieval process, in accordance with an embodiment of the invention.

For a better understanding of the foregoing, attention is now directed to FIG. 5, illustrating a flow chart of the operational steps of signature calculation and retrieval process, in accordance with an embodiment of the invention. Thus, a signature is calculated in respect of a sub-segment under consideration (51 and 52). Ignoring for a moment inquiry 53 and step 54 (which will be discussed in more detail below), it is tested whether the signature resides in either the fast memory or the slow memory (55) and if in the affirmative it is fetched form the fast memory or the slow disk (56) (which the case may be) and compared to the so calculated signature (57) and in the case of match, there is nothing to be done and the next sub-segment (or block) is processed (58). Reverting now to inquiry (55), in the case that the signature is found neither in the fast memory nor in the slow disk, this indicates that the sub-segment under consideration is new, and that it (or derivative version thereof) should be transmitted to the remote site (59) and that the calculated signature should be stored in the signature database.

Turning now to inquiry 57, in the case of mismatch, there is a need to transmit the currently processed sub-segment or derivative thereof (59).

Note, generally, that the term fast memory (storage) does not necessarily imply on any particular physical storage or associated memory management. It merely indicated that fast storage is considerably faster than the external slow storage which stores the signature database. In the same manner, the system is not bound to any specific external storage or memory management. Typical, yet not exclusive, example of fast storage being cache memory. Note that by one embodiment, the cache management itself (what to keep in memory and what in disk) may be implemented in several ways, the cache is a writeback cache. Typical yet not exclusive examples of slow storage being local hard disk, external SCSI disk, or even the main system storage disk array.

By another improvement, there is further provided in the fast memory, a list of the signatures of sub-segments that appear often. The list (which is not bound to any specific data structure realization) further stores short codes of these segments. For example, a block of zeros is quite common, since zero padding of tail portions in the external storage is quite often used. Other non-limiting examples of blocks that are commonly repeated belong to headers, spreadsheets, formatted documents, email attachments etc.

Such sub-segments (and their respective codes) are well familiar also to the remote side, since, naturally, zero padded blocks are also stored in the remote side. Thus, the list stores signature of such zero padded sub-segment and a code. Thus, whenever there is a need to transfer a zero padded sub-segment (e.g. in the case that the currently stored non-zero content of a given sub-segment is padded by zeros), there is no need to send explicitly the sub-segment or even to compress it, but rather, when if it is found that this is a commonly used sub-segment, the code thereof (which, as a rule, is very short compared to sub-segment size or even compressed-sub-segment) is transmitted, thus further improving system performance. This is illustrated in additional steps 53 and 54 of FIG. 5. The remote site, when receiving the code, accesses a corresponding database and fetch the sub-segment data that corresponds to this code. Note that the code may be for example the signature of the said sub-segment, or an identifier of the sub-segment.

Those versed in the art will readily appreciate that the specified embodiment is not bound by zero padded blocks, which were given for illustrative purposes only.

Having described a non limiting example of implementing faster access by pre-fetching banks of signatures from the slower storage to the faster one, there follows now provided a brief description for explaining how to access the signature database for the purpose of inquiring whether a calculated signature is stored in the signature database or not. This applied to both signatures stored in the faster storage and in the slower storage. The invention is of course not bound by this particular implementation. Thus, in order to retrieve signatures from the fast or slow storage, the location of the each signature should be efficiently determined. By this embodiment, the location of the signatures is coded as an Interval Tree (which is generally known per se). In this binary tree leaves represent a continuous region in the memory or disk which contains the signature of a continuous interval of sub-segments. The non leaf nodes are of the form "sub-segments on the left side has index bigger than some value". In order to locate a given signature of a subsegment, all that is needed is to traverse the interval tree, if the leaf contains the address of the signature, then the location is found and the signature can be fetched, and if not then the signature is currently not stored in the system. For efficiency, the interval tree is kept as balanced tree. Also, if possible, each leaf represents a long interval (the size of each interval is of a track or more, which by one embodiment accounts for 32 subsegments or more.)

Turning now to another embodiment, the system's performance can be improved by employing a so called context switching. Before turning to describe is this improvement, there follows a short background discussion. Thus, as may be recalled, in replication which is not synchronous (e.g. a-synchronous mode or snap-shot modes) it is possible to delay the treatment of blocks for a given time interval. In other words it is allowed to maintain certain inconsistency between the first volume and a second remote volume. (Note that the description below refers to volumes for convenience only, and this is by no means binding.)

Bearing this in mind, it may be also noted that many storage sites employ a multi context. Consider, for example, a bank application where there may be many contexts such as email server (first context) financial transaction database (second context), etc. Note that in many storage systems, there is a clear distinction between applications in the sense that different applications use different volumes or partitions in the slow storage. In other words, the email server data resides in distinct volume(s) of the storage and the transaction database data reside in other volume(s) of the slow storage.

Moving on with the bank system example, in such application, the bank may allow a limited inconsistency, of, say 30 minutes for the financial transaction context and 1 hour for the email server context (allowing thus the use of the less costly non-synchronous replication, rather than the more costly synchronous one). This means, that in the case of system malfunction and loss of data in a main bank site (where the first volumes reside), the data may be recovered (on the basis of the stored data in the remote second volumes) to the extent that it reflects an update up to the last 30 minutes (or less) insofar as financial transactions are concerned, and up to the last 1 hour (or less) insofar as email server is concerned.

Note also that, naturally, incoming data that arrive from the various applications (e.g. blocks of data originating of the email server and transaction database) do not, as a rule, comply with some well organized sequence. Thus, it may well be the case that from arbitrarily incoming 5 blocks, the first "belongs" to the email context, the second and third "belong" to the transaction database, the fourth "belongs" to the email context and the fifth "belongs" to the transaction database.

As has also been mentioned above in connection with the non limiting embodiment described, with reference to FIG. 5, in order to expedite performance, the fast memory (e.g. cache) is used to store data (i.e. stored signatures) pre-fetched from the signature (slow) storage, thereby facilitating faster comparison between the so calculated signature (of the sub-segment under consideration) and the stored signature (in the case that the latter is stored in the fast main memory) compared to the case where signature data is retrieved from the slow signature storage for the purpose of comparison. Obviously, considering that the fast memory and in particular the cache cannot accommodate the entire signature database (of, say 8 GB), a policy is employed to decide which signatures to pre-fetch, all as was explained with respect to the non-limiting embodiment described with reference to FIG. 5.

Bearing all this in mind, a naive implementation, may require processing the incoming blocks as they come. Since, however, and as specified above, there is no preliminary knowledge to what context each incoming block belongs, the fast memory to which signature data is loaded (using the policy discussed in FIG. 5, or other one) should accommodate signatures from two and possibly more contexts. In certain embodiments this can be relatively easy to implement, since as specified above signature data for each context reside in distinct area [volume] in the slow signature storage. Thus, by this specific example, a first part of the fast memory is allocated to store signature data retrieved from the email context area of the slow signature storage and a second part of the fast memory is allocated to store signature data retrieved from the financial transaction context area of the slow signature storage. Obviously the more contexts there are, the less area is allocated for each context in the fast memory.

Now, reverting to the naive implementation, and assuming the 5 blocks discussed above (first belonging to email, second and third transaction database, fourth email and fifth transaction database) they are processed one at a time. Thus at the onset, the first block (relating to email data) is processed in the manner specified, i.e. in accordance with one embodiment it includes, dividing the block to sub-segments and in respect of each sub-segment calculating signature, ascertaining if the corresponding signature data resides in the main memory, if yes applying the comparison and determining whether or not to transmit the sub-segment to the remote site, depending on the signature comparison result. If, however, the sought signature is not stored in the main memory, but rather it is stored in the signature database in the slow memory, the signature should be retrieved, and the comparison applied. Having completed the processing of the first block the same procedure is applied to the second block (belonging to the transaction database). Note here that for the second block the other part of the memory is used, i.e., the one that stores transaction signature data. The procedure is repeated for each block in the manner specified. Those versed in the art will readily appreciate that the naive approach suffers from various limitations. For one, for each block, only part of the (fast) memory is used. Thus for the first block (email context) only the memory part that stores email signature data is used. Obviously, the prospects of finding the sought signature in the fast memory part that store email signature data are smaller compared to a situation where larger part of the fast memory could be exploited, necessarily entailing more accesses to the slow signature database, and thereby adversely affecting the overall system performance. In addition due to the switch between the contexts (e.g. in the latter example switching between email/transaction contexts, depending on the context of the incoming block), there is additional overhead when accessing the slow signature database, since, as specified above, each context may be stored in different area of the storage and moving frequently between one area to the other of the storage renders the slow disk access even slower, thereby further adversely affecting the system performance. Note that in real-life scenarios, there are as a rule more contexts and accordingly the system performance is further degraded.

It is noteworthy, that the more contexts there are, the smaller is the part in the main memory that can be allocated for each context thus further reducing the chance of finding the sought signature in the main memory and posing undue overhead in accessing the slow signature storage.

Figure 6:
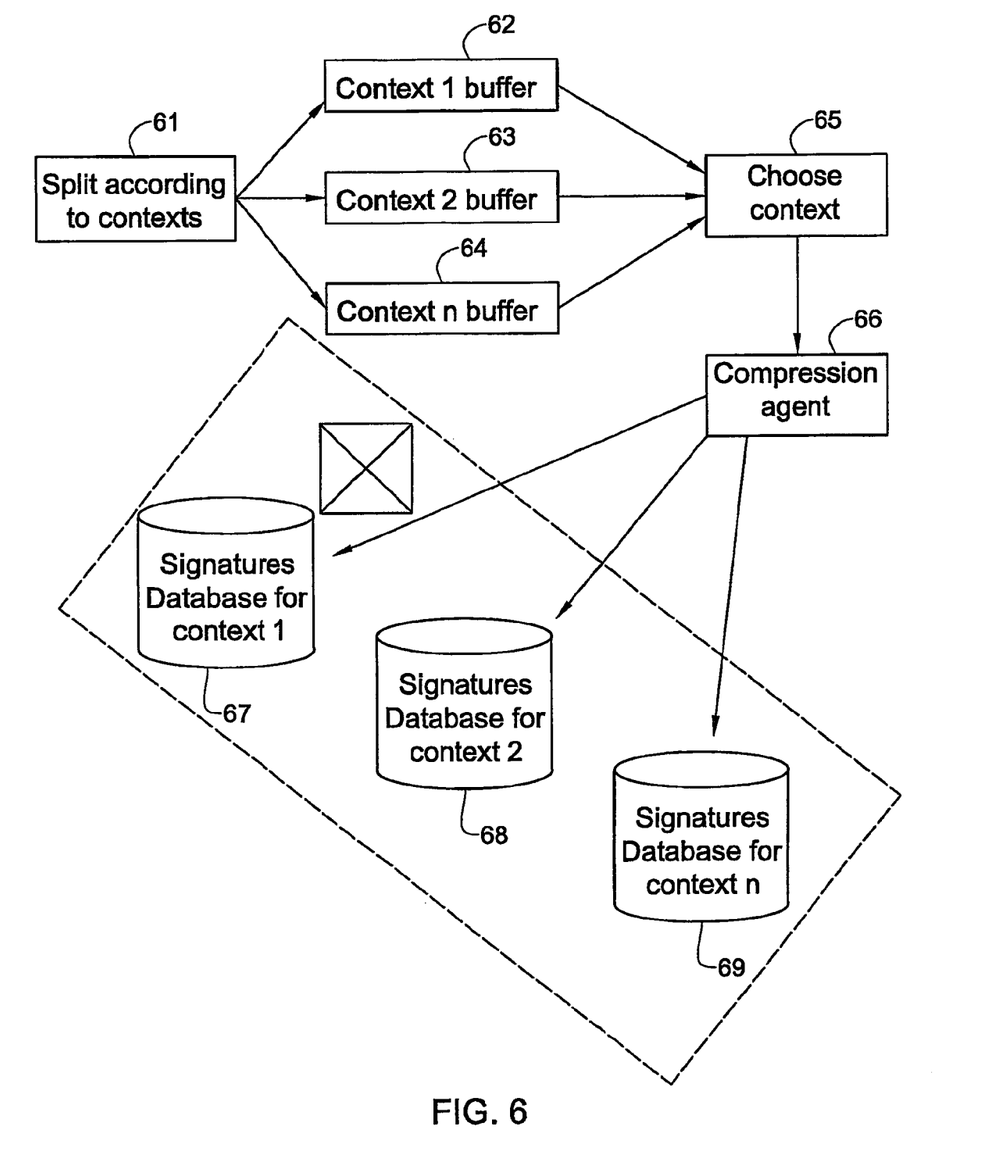
FIG. 6 illustrates a system architecture of a so called context switching, in accordance with an embodiment of the invention.

Bearing all this in mind, a context switching application in accordance with one embodiment of the invention (with reference to FIG. 6) will now be described. The context switching application is particularly useful for non-synchronous update (e.g. the specified non-synchronous replication application), where it is permitted to maintain certain inconsistency between the local and remote volumes of data. By this embodiment, a context splitter 61 splits the incoming blocks according to their contexts to distinct context buffers. In the example of FIG. 6, there are shown three distinct buffers 62 to 64. The invention is not bound to any specific manner of splitting the contexts, and by one simplified embodiment, the incoming blocks are identified according to their source (e.g. email, transaction database, etc.) and stored in their respective buffer. Now, assuming that blocks that belong to the first context 62 are processed (in accordance with the selection of context selector module 65), the incoming blocks of this context are retrieved in, say FIFO fashion from the buffer 62 and are processed one at a time.

Note that incoming blocks that belong to the currently non-selected contexts are stored in their respective buffers 63 and 64 and will be processed later. This necessarily entails that there will be a delay in processing them (i.e. the blocks stored in buffers 63 and 64) and identifying whether or not there is a change in these blocks that requires to transmit update to the remote side. However, as may be recalled, in non-synchronous applications (such as the specified non-synchronous replication), a delayed update is permitted (according to the maximal permitted delay prescribed by the replication policy) and what is required is to assure that the delay time of processing these blocks will not exceed the maximal permitted delay and that blocks are retrieved and processed before buffer overflow is encountered. These constraints can be adequately handled by the context selection module which will switch context before the specified violations occur. Note that the context selection module is not bound by the specified decision policies, and accordingly others may be employed, depending upon the particular application.

Reverting now to FIG. 6, and as further shown, the slow signature storage is split to distinct areas 67 to 69 according to the respective contexts. Note that for convenience they are shown as distinct modules, but in reality the distinct areas may be separate parts of the same storage.

Now, when a given context buffer is selected, (say 62) the appropriate signature database is accessed (say 67 storing signature data for context 1) and signatures are pre-fetched therefrom and stored in a large portion of the (fast) memory space that is allocated for signature data.

It is important to note that whereas in the specified naive approach only part of the fast memory was utilized for a given context (leaving the remaining parts to other contexts), in accordance with a non limiting context switching embodiment described herein, the parts of the fast memory areas that before were allocated to other contexts (in the naive implementation) can be utilized to store data of the currently processed context, since blocks from the same context will be continuously processed (i.e. one block after the other, all extracted from the same context buffer) until the processing will be switched to another context, under the control of the context selector 65. Note that due to the fact that larger (fast) memory space is used for this particular context (compared to say the naive approach) the prospects of locating the sought signature in the fast memory are considerably increased, reducing thus the rate of access to the slow signature database, and thereby considerably improving the system's performance. Note also that throughout the processing of the same context, whenever there is a need to access the slow database (if the sought signature is not found in the fast memory) it is always performed to the same area (e.g. 67) obviating the additional overhead of switching between the different storage areas, as is the case in the specified naive approach, which as may be recalled necessitates switching to different areas of the storage depending on the context of the currently processed block.

Reverting now to the switch context processing, by this embodiment the processing of each block (as extracted from the context buffer), may be, e.g. in the manner similar to that discussed with reference to FIG. 2-4 above, and the decision which signatures to load and store in the main (fast) memory may be e.g. in accordance with the policy described in FIG. 5. When the context selector switches to a different context buffer (say, 63) the procedure is repeated in respect of the blocks that belong to this context, and so forth. Obviously, whilst processing the blocks of the newly selected context, the incoming blocks that belong to the previously processed context are accumulated in their context buffer until the latter is re-selected by the context selector.

Those versed in the art will readily appreciate that the present invention is not limited to a separate device. The compression engine may be software/hardware based and reside on each of the nodes that use the storage sub-system. In such an architecture the network gateway is also part of the host.

There follows now a brief overview of three non-limiting system architectures. In the first architecture shown in FIG. 7A, the compression engine 71 and its resources (memory, disk, network connection, and CPU) for performing the signatures and storing them reside in the host computer 72. In this architecture the compression engine runs as a software ingredient.

In a second architecture (illustrated in FIG. 7B) some work is performed in the host computer and some work is performed in a separate computer when the compression engine runs. Specifically, it is fairly natural to perform the signature calculation (73) in the host and then to send the calculated signature and its associated sub-segment to the compression engine (74), as well as the sub-segment itself to the disk for storage. The signature matching and signature database management are performed in the compression engine.

In accordance with a third embodiment (see FIG. 7C) the host transfers the sub-segment both to the Disk for storage and to a separate compression engine (75) computer which performs all the operations including signature calculation, signature, retrieval, comparison and signature database management operations (including caching and/or context switching, if applicable). If desired two or more of the specified modes may be operated in the same system, which may switch between the respective modes, depending on decision criterion, such as load balancing.

Figure 7A:
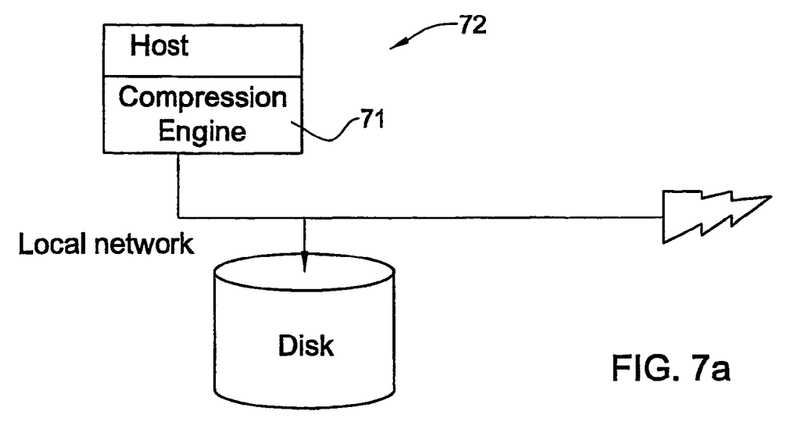
FIGS. 7A-C illustrate three distinct embodiments of different system architectures.
Figure 7B:
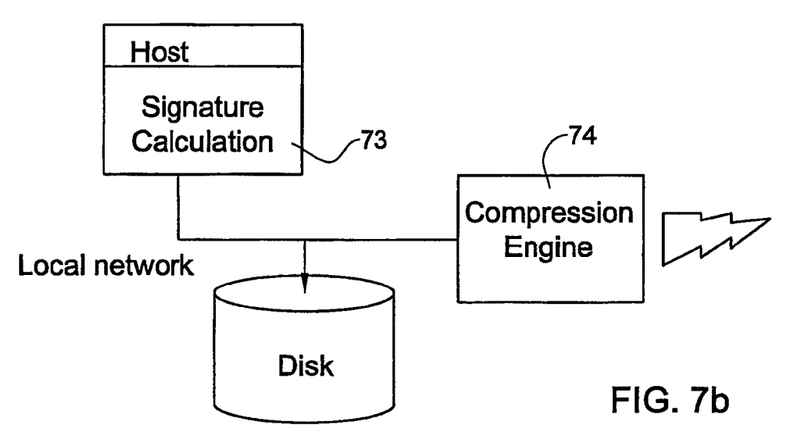
Figure 7C:
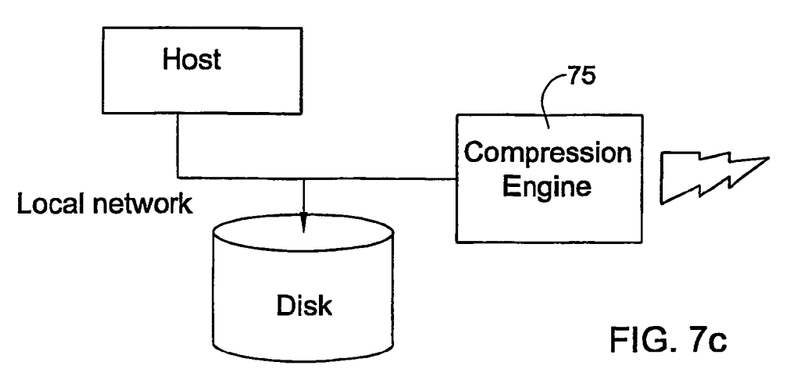

Note that the invention is by no means bound by this specific embodiments, described with reference to FIGS. 7A-C, and accordingly other variants are applicable, all as required and appropriate.

By another embodiment, in the case of that certain rules are violated, say the space required to allocate the signatures exceeds the available storage space or, say, certain corruption in the signature database is encountered, the compression engine operation may be temporarily circumvented giving rise to a mode of operation where incoming sub-segments are transmitted as is (or in compressed form) to the remote site, thereby not causing any damage due to loss of data. Once the malfunction is overcome, the operation of the compression engine is resumed and continued in the manner specified above. The net effect is that even in system malfunction or other pre-defined operational scenarios, no loss of data occurs, and this at the cost of temporal system degraded performance. It will also be understood that the system according to certain embodiments of the invention may be a suitably programmed computer. Likewise, the invention contemplates a computer program being readable by a computer for executing the method of the invention. The invention further contemplates a machine-readable memory tangibly embodying a program of instructions executable by the machine for executing the method of the invention.

Note that regardless of the embodiment under consideration, the remote site receives the transmitted sub-segment (with an associated address) and stores it in the database (say replicated copy in the case of a replication application), all as known per se. In those cases where a compressed or coded sub-segment is received at the remote site, it first derives the sub-segment and stores it, again as known per se.

The present invention has been described with a certain degree of particularity, but those versed in the art will readily appreciate that various alterations and modifications can be carried out without departing from the scope of the following Claims:

The invention claimed is:

1. A system for efficiently transmitting data from a first site to at least one remote site over a communication medium, the data includes blocks of data; the system comprising:
   storage for storing data in sub-segment boundaries, such that at least one sub-segment is accommodated in each block; said storage includes at least two storage buffers, wherein blocks of data having the same context are stored in only one of the at least two storage buffers;
   a context splitter configured to split incoming data blocks according to their context and for each incoming data block, the context splitter is configured to provide the incoming data block to a corresponding one of the at least two storage buffers having data blocks of the same context as the incoming data block;

signature storage for storing data including signature data; each one of said sub-segments is associated with at least one signature; each signature has a signature size smaller than its respective sub-segment size;

the system includes a processor configured to perform at least the following, as many times as required:

receiving a block;

in the case the block accommodates more than one sub-segment, partitioning the block into sub-segments;

for each sub-segment in the block, calculating at least one signature;

determining whether the calculated signature matches a corresponding signature, if any, stored in the signature storage; and in case of no match indicating that the sub-segment is new or has been modified:

performing non-synchronous data replication by maintaining the sub-segment in the storage for a period of time before transmitting the sub-segment to at least one of said remote sites, and storing the calculated signature in the signature storage, wherein said processor is further configured to selectively switch between one of said at least two storage buffers and wherein said signature processing is performed in said selected storage buffer in respect of blocks that are stored in said selected storage buffer.

2. The system according to claim 1, wherein said signature storage includes a first storage and a second storage configured to store faster than first storage.

3. The system according to claim 2, wherein said second storage includes cache memory.

4. The system according to claim 3, wherein said processor is further configured to pre-fetch signatures from the first storage to the second storage, and wherein said determining further includes determining whether the calculated signature matches the corresponding signature, if any, stored in the second storage or the first storage.

5. The system according to claim 4, wherein said processor pre-fetches frequently used sub-segment signatures from the first storage to the second storage.

6. The system according to claim 1, wherein sub-segments for transmission are compressed to thereby constitute derivatives of said sub-segments.

7. The system according to claim 2, wherein said second storage further storing a list of commonly used sub-segments and associated codes being each shorter than the respective sub-segment, and in the case that a sub-segment that is to be transmitted belongs to said commonly used sub-segments, transmitting the associated code which constitutes derivatives of the sub-segment.

8. The system according to claim 1 used for data replication.

9. The system according to claim 1 used for backup.

10. The system according to claim 1 used for data migration.

11. A processor for operating in a system for efficiently transmitting data from a first site to at least one remote site over a communication medium, the data includes blocks of data;

the system includes storage for storing data in sub-segment boundaries, such that at least one sub-segment is accommodated in each block; said storage includes at least two storage buffers; blocks of data having the same context are stored in only one of the at least two storage buffers, the system further includes signature storage for storing data including signature data; each one of said sub-segments is associated with at least one signature; each signature has a signature size considerably smaller than its respective sub-segment size, the system further includes a context splitter configured to split incoming data blocks according to their context and for each incoming data block, the context splitter is configured to provide the incoming data block to a corresponding one of the at least two storage buffers having data blocks of the same context as the incoming data block;

the processor configured to perform at least the following, as many times as required:

receiving a block;

in the case the block accommodates more than one sub-segment partitioning the block into sub-segments;

for each sub-segment in the block calculating at least one signature;

determining whether the calculated signature is identical to a corresponding signature, if any, stored in the signature storage; and in case of no match indicating that the sub-segment is new or has been modified:

performing non-synchronous data replication by maintaining the sub-segment in the storage for a period of time before transmitting the sub-segment to at least one of said remote sites, and storing the calculated signature in the signature storage, wherein said processor is further configured to selectively switch between one of said at least two storage buffers, and wherein said signature processing is performed in said selected storage buffer in respect of blocks that are stored at the selected storage buffer.

12. A method for efficiently transmitting data from a first site to at least one remote site over a communication medium, the data includes blocks of data stored at a storage that includes at least two storage buffers, blocks of data having the same context are stored in only one of the at least two storage buffers; the method comprising:

splitting incoming data blocks according to their context;

providing the incoming data block to a corresponding one of the at least two storage buffers having data blocks of the same context as the incoming data block;

receiving a succession blocks and partitioning each to sub-segments, if required;

processing the sub-segments and for each sub-segment calculating at least one signature;

determining whether the calculated signature is identical to a corresponding signature, if any, stored in a signature storage, and in case of no match indicating that the sub-segment is new or has been modified performing non-synchronous data replication by maintaining the sub-segment in the storage for a period of time before transmitting the sub-segment to at least one of said remote sites, and storing the calculated signature in the signature storage, wherein said method further comprising selectively switching between one of said at least two storage buffers, and wherein said signature processing is performed in said selected storage buffer in respect of blocks that are stored at the selected storage buffer.

13. A method for processing data to generate a compressed data for transmission from a first site to at least one remote site over a communication medium, comprising:

at the first site, processing successions of data portions and identifying those portions which were changed;

generating a compressed data that includes data portions which were changed; and performing non-synchronous data replication by maintaining the data portions in a storage for a period of time to mitigate loss of data in an event of a malfunction before transmitting the compressed data over the communication medium, wherein said data portions are stored at the storage having at least two storage buffers blocks of data having the same context are stored in only one of the at least two storage buffers, wherein said method further comprising selecting one of said storage buffers and said processing is performed in respect of data portions that are stored at the selected storage buffer, and wherein a context splitter is configured to split incoming data blocks according to their context and for each incoming data block, the context splitter is configured to provide the incoming data block to a corresponding one of the at least two storage buffers having data blocks of the same context as the incoming data block.

14. The processor according to claim 11, wherein said signature storage includes a first storage and a second storage configured to store faster than first storage.

15. The processor according to claim 14, wherein said second storage includes cache memory.

16. The processor according to claim 14, wherein said processor is further configured to pre-fetch signatures from the first storage to the second storage, and wherein said determining further includes determining whether the calculated signature matches the corresponding signature, if any, stored in the second storage or the first storage.

17. The processor according to claim 16, wherein said processor pre-fetches frequently used sub-segment signatures from the first storage to the second storage.

18. The processor according to claim 14, wherein sub-segments for transmission are compressed to thereby constitute derivatives of said sub-segments.

19. The processor according to claim 14, wherein said second storage further storing a list of commonly used sub-segments and associated codes being each shorter than the respective sub-segment, and in the case that a sub-segment that is to be transmitted belongs to said commonly used sub-segments, transmitting the associated code which constitutes derivatives of the sub-segment.

20. The processor according to claim 11 used for data replication.

21. The processor according to claim 11 used for backup.

22. The processor according to claim 11 used for data migration.

23. A method according to claim 12 wherein said signature storage includes a first storage and a second storage and wherein said method further includes, for each selected storage buffer, pre-fetching signatures from the first storage to the second storage.

24. A method according to claim 12 wherein said signature storage includes a first storage and a second storage and wherein said method further includes pre-fetching frequently used sub-segment signatures from the first storage to the second storage.

25. A method according to claim 12 wherein sub-segments for transmission are compressed to thereby constitute derivatives of said sub-segments.

26. A method according to claim 23 wherein said second storage further storing a list of commonly used sub-segments and associated codes being each shorter than respective sub-segment, and in the case that a sub-segment that is to be transmitted belongs to said commonly used sub-segments, transmitting the associated code which constitutes derivatives of the sub-segment.

27. The method according to claim 12 used for data replication.

28. The method according to claim 12 used for backup.

29. The method according to claim 12 used for data migration.

30. A system for efficiently transmitting data from a first site to at least one remote site over a communication medium, the data includes blocks of data; the system comprising:

storage for storing data in sub-segment boundaries, such that at least one sub-segment is accommodated in each block; said storage includes at least two storage buffers, wherein blocks of data having the same context are stored in only one of the at least two storage buffers;

a context splitter configured to split incoming data blocks according to their context and for each incoming data block, the context splitter is configured to provide the incoming data block to a corresponding one of the at least two storage buffers having data blocks of the same context as the incoming data block;

signature storage for storing data including signature data; each one of said sub-segments is associated with at least one signature; each signature has a signature size smaller than its respective sub-segment size;

the system includes a processor configured to perform at least the following, as many times as required:

receiving a block;

in the case the block accommodates more than one sub-segment, partitioning the block into sub-segments;

for each sub-segment in the block, calculating at least one signature;

determining whether the calculated signature matches a corresponding signature, if any, stored in the signature storage; and in case of no match indicating that the sub-segment is new or has been modified:

performing non-synchronous data replication by maintaining the sub-segment in the storage for a period of time before transmitting the sub-segment to at least one of said remote sites, and storing the calculated signature in the signature storage, wherein said processor is further configured to selectively switch between one of said at least two storage buffers and wherein said signature processing is performed in said selected storage buffer in respect of blocks that are stored in said selected storage buffer.

31. The system of claim 1, wherein the sub-segment is transmitted to at least one of said remote sites after expiration of a non-synchronous transmittal period and according to the application context origin of the block.

* * * * *